United States Patent [19]

Böhm et al.

[11] 4,067,207
[45] Jan. 10, 1978

[54] FLEXIBLE COUPLING AND TORQUE-TRANSMITTING ELEMENT THEREFOR

[76] Inventors: Heinz-Dieter Böhm, Peukinger Weg 18, Unna, Germany, 475; Dietwald Darenberg, Ostholz 16, Frondenberg-Ardey, Germany, 5758; Lothar Ernst, Iserlohnerstr. 27a, Unna, Germany, 475; Werner Rüggen, Lessingstr. 7, Holzwickede, Germany, 4755

[21] Appl. No.: 691,175

[22] Filed: May 28, 1976

[30] Foreign Application Priority Data

June 5, 1975  Germany .............................. 2525009

[51] Int. Cl. ............................................. F16d 23/10
[52] U.S. Cl. ....................................... 64/26; 64/11 R; 64/27 NM
[58] Field of Search ................... 64/26, 11 R, 27 NM, 64/14

[56] References Cited

U.S. PATENT DOCUMENTS

| | | | |
|---|---|---|---|
| 1,815,639 | 3/1937 | Wilkin et al. | 64/26 |
| 1,954,292 | 4/1934 | Hassley | 64/26 |
| 2,972,241 | 2/1961 | Hackforth | 64/26 |
| 3,926,074 | 12/1975 | Sigahara | 64/26 |

FOREIGN PATENT DOCUMENTS

| | | | |
|---|---|---|---|
| 1,346,685 | 11/1963 | France | 64/26 |

*Primary Examiner*—Samuel Scott
*Assistant Examiner*—R. C. Turner
*Attorney, Agent, or Firm*—Erwin Salzer

[57] ABSTRACT

The driving coupling member and the driven coupling member of a flexible coupling are tied together by a plurality of flexible torque-transmitting members which are arranged in a circular pattern. Each torque-transmitting member consists of an endless, substantially elliptical loop of an elastic material, e.g. rubber, which may be re-inforced by an appropriate woven material. Resilient inserts are placed into the elliptical cavities defined by the torque-transmitting members, and these inserts are compressed when the torque-transmitting members are elongated as a result of the transmission of torques between both coupling members. The aforementioned resilient inserts expand when the amount of torque transmitted is reduced. The expansion and contraction of the aforementioned inserts are transmitted to containers of a fluid medium and cause said fluid medium to flow out of a contracting container into another container. The flow of fluid is controlled by a restricted orifice. As a result, the flow of fluid exerts a controllable shock-absorbing damping action upon the flexible coupling. The aforementioned torque-transmitting members are supported by studs, or bolts, projecting from the driving and driven member, respectively, of the flexible coupling.

14 Claims, 6 Drawing Figures

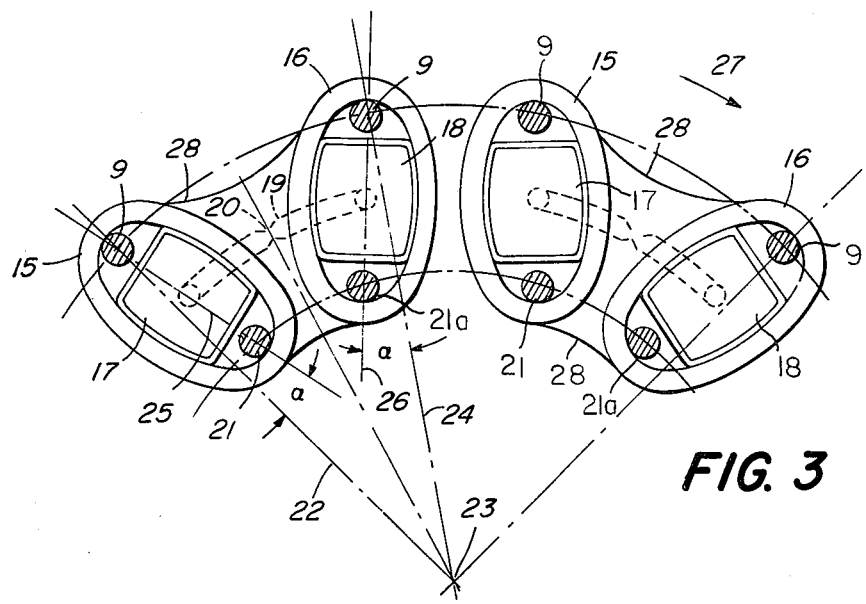
FIG. 3
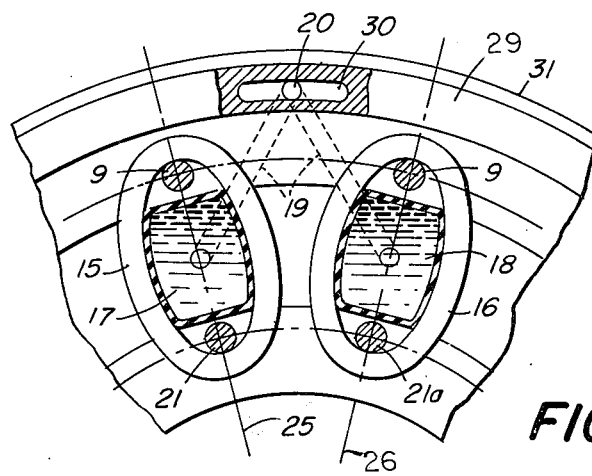
FIG. 4
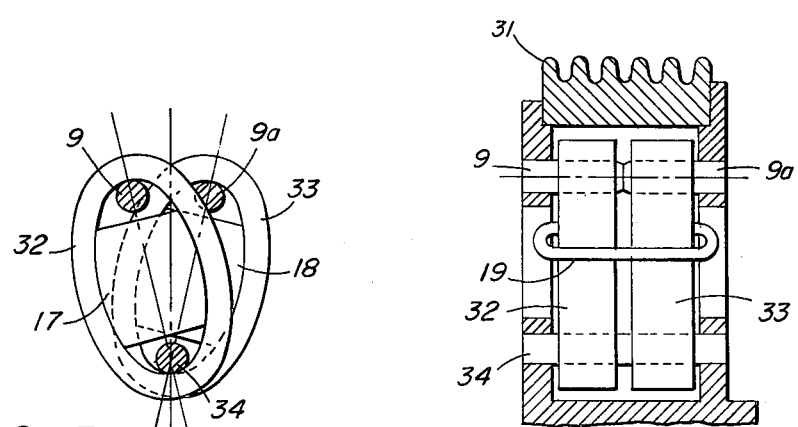
FIG. 5
FIG. 6

FLEXIBLE COUPLING AND TORQUE-TRANSMITTING ELEMENT THEREFOR

BACKGROUND OF THE INVENTION

This invention relates to flexible couplings which comprise a driving coupling member, a driven coupling member, a plurality of torque-transmitting members of which each forms an elongated endless loop, and a plurality of resilient inserts of which each is arranged inside of the cavity defined by one of the torque-transmitting members. The torque-transmitting members may be supported by studs or bolts projecting from the two parts of the coupling, i.e. its driving member and its driven member. When the coupling is transmitting a torque the endless-loop-torque-transmitting members are stressed in a direction longitudinally thereof and they then compress the resilient inserts which are arranged in the substantially elliptical space bounded by each torque-transmitting member. This is accompanied by a progressive increase of the torque transmitted when the operation of some of equipment, e.g. a winch, is started. These favorable properties have resulted in a wide acceptance of flexible couplings of the aforementioned description.

The present invention relates to an improvement of the aforementioned couplings.

Every flexible coupling has specific damping or shock-absorbing characteristics, which are generally of a fixed nature. It is, however, desired to change the nature of the damping or shock-absorbing characteristics of flexible couplings, because different applications require different damping or shock-absorbing characteristics. As a general rule an internal combustion machine drive requires a higher damping than an electric motor drive. It is, therefore, the prime object of the present invention to provide flexible couplings of the aforementioned description which have variable damping means, i.e., damping means which allow to vary the extent of the damping of the coupling.

Other objects of the invention will become apparent as this specification thereof proceeds.

SUMMARY OF THE INVENTION

Flexible couplings embodying this invention include a driving coupling member and a driven coupling member and a plurality of torque-transmitting members arranged in a circular pattern, each forming an elongated closed loop, and each being stud-supported on one end thereof by said driving coupling member and on the other end thereof by said driven coupling member. Couplings embodying this invention further include a plurality of resilient inserts each arranged inside of one of said plurality of torque-transmitting members and each subject to deformation by stresses imposed upon said plurality of torque-transmitting members incident to transmission of torques from said driving member to said driven member. Couplings embodying this invention further include a plurality of interconnected bodies of fluid under the action of said plurality of inserts for establishing a shock-absorbing damping action by flows of fluid in response to deformation of said plurality of resilient inserts. In the preferred embodiments of the invention the inserts are adapted to form fluid-filled containers but, as an alternative, they may be used only as means for squeezing fluid out of additional or separate containers, or compelling fluid to flow into additional or separate containers.

BRIEF DESCRIPTION OF THE DRAWINGS

FIG. 3 is partly a section similar to that of FIG. 2 and partly an elevation of a modification of the embodiment of the invention shown in FIGS. 1 and 2;

FIG. 4 is partly a section similar to that shown in FIG. 3 and partly an elevation of a modification of the structure of FIG. 3 including the addition of cooling means for the damping fluid;

FIG. 5 shows diagrammatically in elevation a pair of torque-transmitting members and a pair of fluid-receiving inserts therefor, the former being suspended from the two parts of the coupling in a way different from that shown in previous figures, and FIG. 6 is partly a side elevation and partly a longitudinal section of the structure shown in FIG. 5.

DESCRIPTION OF THE PREFERRED EMBODIMENTS

Figure 1:
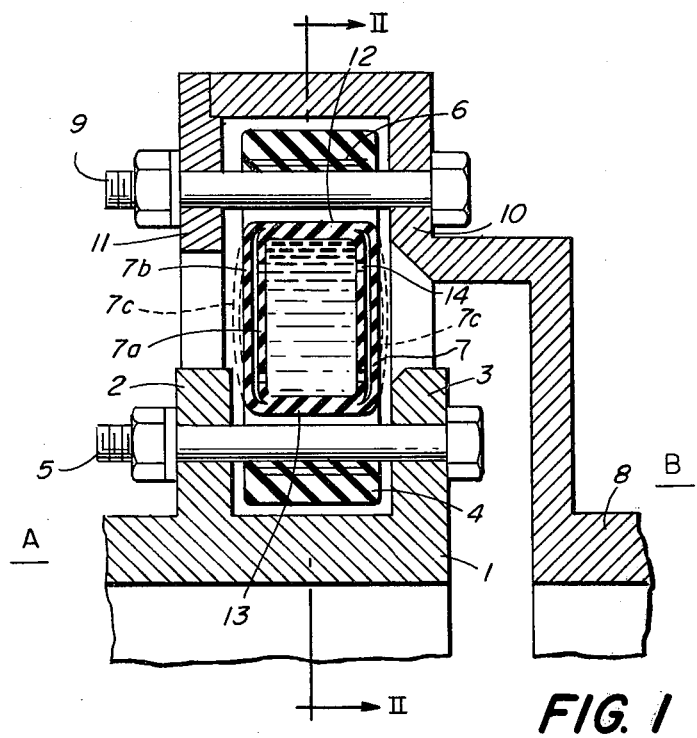
FIG. 1 is substantially a vertical section of a portion of a flexible coupling embodying this invention, namely the upper portion thereof, the lower portion of the coupling not being shown in FIG. 1 since it is identical with the upper portion thereof, and FIG. 1 showing some parts of the coupling in elevation rather than sectionalized.

In FIG. 1 reference character A has been applied to generally indicate one coupling member and reference character B has been applied to generally indicate the other coupling member of a flexible coupling. Coupling member A may either be the driving or the driven coupling member, and the same applies as to coupling member B. Coupling member A includes a hub portion 1 and two flanges 2 and 3. Studs 5 project transversely through flanges 2 and 3 of coupling member A and are arranged in a circular pattern. The portion 8 of coupling member B is intended to form a hub for receiving a shaft and the flange 10 of coupling member B projects radially outwardly from hub 8. A plurality of studs or bolts 9 project transversely through flange 10 and through an annular member 11 arranged in a plane parallel to the principal plane of flange 10. Studs or bolts 9 are arranged in a circular pattern as are studs or bolts 5, but the radius of the pattern formed by studs 9 is larger than the radius of the pattern formed by bolts 5. Reference numeral 4 has been applied to indicate a plurality of elongated torque-transmitting members of which each forms a closed loop substantially in the shape of an ellipse. Members 4 are arranged in a circular pattern and one of the radially outer studs projects through the radially outer end of each torque-transmitting member 4 and one of the radially inner studs 5 projects through the radially inner end of each of the torque-transmitting members 4. The loop-shaped torque-transmitting members may be made of an elastomer such as, for instance, rubber, and each of them may be reinforced by an insert of woven cloth indicated by reference numeral 6.

The coupling further includes a plurality of resilient inserts 7 each arranged inside the cavity defined by one of the torque-transmitting substantially elliptical members 4. Each of members 4 is subject to deformation by stresses imposed upon members 4 incident to transmission of torques from member A to member B, or vice versa. Such stresses tend to compress members 4, and this compression of members 4 may be used to move a damping fluid through a restricted orifice. In the particular embodiment of the invention shown in FIGS. 1 and 2 each of the resilient inserts 7 is adapted to form and forms a container for a body of fluid 7d. Reference character 7a has been applied to indicate the lateral walls of the fluid-container-forming resilient inserts 7 of the torque-transmitting members 4 which walls are out of engagement with members 4. The resilient inserts 7 and the containers which may be formed by them may be made of a suitable elastomer, e.g. rubber, and the body of fluid 7d may be any desired liquid, e.g. oil, as long as the liquid is compatible with the elastomer in which it is stored. Reference characters 12 and 13 have been applied to indicate the radially outer and the radially inner walls of the fluid-container-forming resilient inserts 7. The fluid-container-forming inserts 7 are enclosed in another container 7b. Container 7b has substantially the same radial extent as container 7, but is of a slightly larger axial width than container 7. The radially outer surfaces and the radially inner surfaces of containers 7b may be vulcanized to the radially outer and the radially inner surfaces of containers 7. Thus containers 7b form, in effect, two bladders of which each is positioned at opposite sides of the lateral surfaces 7a of fluid-container-forming resilient inserts 7 or, in other words, at the open sides of closed loops 4. The fluid-container-forming inserts 7 are bonded to torque-transmitting closed loop-shaped members 4 at their respective interfaces, e.g. by vulcanization.

The fluid-container-forming inserts 7 have perforations 14 of restricted size in the lateral walls 7a thereof by which fluid 7d may flow at a restricted rate from the inside of the fluid-container-forming inserts 7 to the spaces bounded by the lateral sides of containers 7b. Containers 7b take the shape indicated by lines 7c when a predetermined amount of fluid has flown into them by way of perforations 14 out of fluid-container-forming inserts 7.

When fluid-container-forming inserts 7 are elongated during the operation of the flexible coupling, fluid flows out of the inner chambers defined by parts 7 into the outer chambers or containers 7b. This results in a shock-absorbing or damping action whose magnitude is largely determined by the size of perforations 14. The outflow of fluid 7d from parts 7 into lateral pockets or containers 7b results in an elastic expansion of the latter. A reduction of the torque transmitted results in a flow of fluid 7d in the reverse direction out of pockets or containers 7b into parts 7. In the case of a tendency of oscillatory motions between the driving coupling member and the driven coupling member such tendency results in a reciprocating forward and backward flow of fluid through perforations 14 which, in turn, results in a considerable damping of such oscillations. It has been found that high frequency oscillations may be completely damped out by means of flexible couplings constructed according to the present invention.

In prior art couplings of the kind under consideration the damping depended primarily and substantially upon the elastic characteristics of the material of which the inserts of the torque-transmitting closed loop bodies were made. In flexible couplings according to this invention the damping depends inter alia upon the velocity of the flow of fluid from one container into another.

Figure 2:
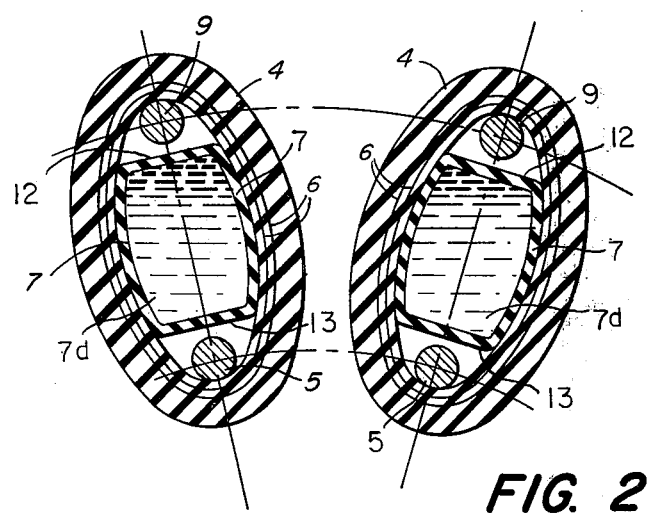
FIG. 2 shows a section along II—II of FIG. 1.

Referring now to FIG. 3, this figure shows pairs of torque-tramsitting members 15 and 16 which are of substantially the same nature and shape as the torque-transmitting members described in connection with FIGS. 1 and 2, but in the structure shown in FIG. 3 pairs of torque-transmitting members 15 and 16 are integrated to form functional and possibly structural units. Each of torque-transmitting members 15,16 is provided with one resilient fluid-container-forming insert 17 and 18, respectively. Containers 17 and 18 are bonded, e.g. vulcanized, to torque-transmitting closed loop members 15 and 16 at their respective interfaces. The insides of containers 15 and 16 communicate by means of a hose 19 which is provided with a region or point 20 of reduced cross-sectional area operating as a throttle. The interchange of fluid between pairs of inserts 15 and 16 requires another arrangement thereof as that shown in FIG. 2. As shown in FIG. 3 the radially outer studs 9 supporting torque-transmitting members 15,16 are arranged in a circular pattern and the straight lines 22,24 interconnect the centers of the cross-sections of studs 9 with the center of the cross-section of the hub portion of the coupling, which is the center of the cross-section of the coupling, i.e., the cross-section taken along II—II of FIG. 1. The radially inner studs 21,21a supporting torque-transmitting members 15,16 are arranged in a circular pattern having a smaller radius than the circular pattern along which studs 9 are arranged. Studs 21,21a are arranged in such a fashion that the lines 25 and 26 that interconnect the centers of studs 9 and 21 and 9 and 21a enclose an angle α with the aforementioned lines 22. Thus studs 21 and 21a are positioned closer to each other than studs 9. The lines 22 and 25 enclose an angle α which may be considered counter-clockwise as seen in FIG. 3, and the lines 24 and 26 enclose an angle α which may be considered clockwise as seen in FIG. 3. Lines 22 and 24 intersect at 23 and lines 25 and 26 intersect along a circle which is spaced from center 23. As a result of this geometry, when torque is transmitted in a given sense, one of a pair of torque-transmitting members 15,16 is compressed, thus causing a flow of fluid in one predetermined direction from one of the members into the other. Assuming a rotation of one of the coupling members to take place in the direction of the arrow 27 resulting in an elongation of torque-transmitting members 16 and in a compression of torque-transmitting members 15, this would result in a flow of fluid from insert containers 18 to insert containers 17 by way of hoses 19. The damping action of the flexible coupling is primarily controlled by the cross-sectional area 20 of the point where the cross-sectional area of hose 19 is restricted. The pairs of hose-interconnected fluid containers 17,18 may be mounted separately on their respective studs 9 and 21,21a. As an alternative, the cooperating containers 17,18 may be integrated into a structural unit by means or loops or webs to which reference numeral 28 has been applied.

The oscillatory movement of fluid from one container to the other results in generation of heat. It may be desirable to provide means such as, for instance, cooling fins for dissipating that heat. A flexible coupling including heat-dissipating means in form of cooling fins has been shown in FIG. 4. That figure shows a pair of elliptical torque-transmitting members 15 and 16 arranged in the same fashion as the torque-transmitting members 15 and 16 shown in FIG. 3. The studs 9 and 21 project through and support torque-transmitting member 15 and the studs 9 and 21a project through and support torque-transmitting member 16. The line 25 interconnecting the centers of the cross-section of studs 9 and 21 intersects the line 26 interconnecting the centers of the cross-sections of studs 9 and 21a at a point which is spaced from the centers of the circles along which studs 9 and 21,21a, respectively, are arranged. Reference numeral 29 has been applied to indicate an annular portion close to the periphery of either the driving member or the driven member of the flexible coupling. Chambers 30 of which but one is shown in FIG. 3 are arranged equidistantly in the portion 29 of one of the coupling members. A hose section 19 connects the fluid-filled resilient insert or container 17 with the space or chamber 30 and another hose section 19 connects the space or chamber 30 with the fluid-filled insert or container 18. Numeral 20 has been applied to indicate a point of restricted cross-sectional area situated in the fluid passageway between containers 17 and 18. The annular portion 29 of one of the coupling members is provided with circular cooling fins 31 for dissipating the heat generated by the flow of fluid between containers 17 and 18.

Referring now to FIGS. 5 and 6, these two figures show an embodiment of the invention which is likewise provided with fluid cooling means. FIGS. 5 and 6 show a pair of torque-transmitting members 32 and 33 having the same physical properties as the torque-transmitting members shown in the previous figures and described in the context thereof. The torque-transmitting members 32 and 33 are arranged in overlapping relation and so are the fluid-filled inserts 17 and 18 arranged inside the torque-transmitting members 32,33. The radially inner ends of torque-transmitting members 32,33 are mounted on a common stud 34 supported on the ends thereof by one of a pair of coupling members. The radially outer end of torque-transmitting member 32 is mounted with one end thereof on a stud 9 forming part of one of two separate coupling members and the radially outer end of the torque-transmitting member 33 is mounted with one end thereof on a stud 9a forming part of the other of two separate coupling members. The line intersecting centers of the cross-sections of studs 9a and 34 and the line intersecting the centers of the cross-sections of studs 9a and 34 intersect in the centers of the cross-section of stud 34. This geometry results in a simultaneous shortening of one of the torque-transmitting members 17,18, and an extension of the other of the torque-transmitting members 17,18 when the flexible coupling is rotated in one given direction, and vice versa. The fluid-filled resilient inserts 17,18 of torque-transmitting members 32,33 are interconnected by a hose 19 and one of the coupling members is provided with an annular element 31 defining a plurality of circular cooling fins.

We claim as our invention:
1. A flexible coupling including
   a. a driving member;
   b. a driven member;
   c. a plurality of flexible torque-transmitting members arranged in a circular pattern each forming an elongated closed loop, each of said torque-transmitting members being supported at one point thereof by a stud supported by said driving member and each of said torque-transmitting members being supported at another point thereof by a rod supported by said driven member so that said plurality of torque-transmitting members transmit torques from said driving member to said driven member;
   d. a plurality of resilient inserts each arranged inside of one of said plurality of torque-transmitting members and each subject to deformation by stresses imposed upon said plurality of torque-transmitting members incident to transmission of the torques from said driving member to said driven member; and
   e. a plurality of interconnected bodies of fluid under the action of said plurality of inserts for establishing a shock-absorbing damping action by flows of fluid in response to deformation of said plurality of resilient inserts.

2. A flexible coupling as specified in claim 1 wherein each of said torque-transmitting members is substantially elliptical in shape and comprises an elastomeric body and a woven reinforcement.

3. A flexible coupling as specified in claim 1 wherein each of said plurality of resilient inserts is adapted to form a container for a fluid and is filled with a body of fluid.

4. A flexible coupling as specified in claim 1 wherein said plurality of containers form interconnected pairs, and wherein each interconnecting means of said pairs includes a point of restricted cross-sectional area.

5. A flexible coupling as specified in claim 3 wherein each of said plurality of inserts is provided with an additional lateral container, and wherein each container formed by one of said plurality of inserts is adapted to communicate with said additional lateral container.

6. A flexible coupling as specified in claim 3 wherein each of said plurality of inserts is provided with a pair of additional lateral containers, each of said pair of additional lateral containers being arranged on opposite sides of one of said plurality of inserts, and wherein each container formed by one of said plurality of resilient inserts is adapted to communicate with said pair of additional lateral containers.

7. A flexible coupling as specified in claim 1 wherein
   a. each of said plurality of torque-transmitting members is substantially elliptical in shape;
   b. contiguous pairs of said plurality of torque-transmitting members are supported by pairs of studs whose center-interconnecting lines intersect at locii situated radially outwardly from the common axis of said driving member and said driven member;
   c. each of said plurality of inserts is adapted to form a container for fluid and is filled with a body of fluid; and wherein
   d. contiguous pairs of said plurality of inserts are interconnected by fluid-carrying hoses.

8. A flexible coupling as specified in claim 1 wherein each of said plurality of inserts is adapted to form a container for fluid and is filled with a body of fluid, and wherein each of said plurality of inserts is bonded to one of said plurality of torque-transmitting members.

9. A flexible coupling as specified in claim 8 wherein each of said plurality of resilient inserts is vulcanized to one of said torque-transmitting members.

10. A flexible coupling as specified in claim 1 wherein the radially inner ends of contiguous pairs of said plurality of torque-transmitting members are mounted on common studs, wherein the radially outer ends of contiguous pairs of said plurality of torque-transmitting members are mounted on separate studs, and wherein fluid-filled containers under the action of contiguous pairs of said plurality of torque-transmitting members are interconnected by fluid-carrying hoses.

11. A flexible coupling as specified in claim 1 wherein the interconnection between said bodies of fluid includes heat exchange means adapted to cool the fluid in said interconnection.

12. A flexible coupling as specified in claim 11 wherein said driving or said driven member is provided with peripheral cooling fins, and wherein a portion of the path of fluid between said bodies of fluid is situated immediately adjacent said cooling fins.

13. A torque-transmitting element for flexible couplings including
 a. a substantially elliptical member of an elastomeric material forming an endless loop and defining a substantially elliptical cavity therein;
 b. a resilient member inside said cavity defining a fluid-tight chamber, said resilient member being restricted to the center region of said cavity and bounding clear transverse passageways on both ends of said substantially elliptical member; and
 c. said cavity being provided with restricted passageway means allowing flows of fluid into and out of said chamber.

14. A torque-transmitting element as specified in claim 13 wherein said resilient member is provided with means defining an additional flexible lateral chamber situated outside of said substantially elliptical cavity, and wherein said restricted passageway means interconnect said fluid-tight chamber defined by said resilient member and said additional lateral chamber so that elongation of said endless loop results in a flow of fluid from said fluid-tight chamber defined by said resilient member into said additional lateral chamber and compression of said endless loop results in a reverse flow of fluid.

* * * * *